US012768974B2

(12) United States Patent
Godet

(10) Patent No.: US 12,768,974 B2
(45) Date of Patent: Oct. 20, 2026

(54) METHOD FOR ESTIMATING THE DISTANCE OF AN ELEMENT WITH RESPECT TO A VEHICLE

(71) Applicant: Continental Automotive Technologies GmbH, Hannover (DE)

(72) Inventor: Sylvain Godet, Grenade (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 130 days.

(21) Appl. No.: 18/737,189

(22) Filed: Jun. 7, 2024

(65) Prior Publication Data

US 2024/0418846 A1 Dec. 19, 2024

(30) Foreign Application Priority Data

Jun. 19, 2023 (FR) ....................................... 2306260

(51) Int. Cl.

| | |
|---|---|
| ***G01S 13/36*** | (2006.01) |
| ***G01S 7/292*** | (2006.01) |
| ***G01S 13/02*** | (2006.01) |

(52) U.S. Cl.

CPC ............ *G01S 13/36* (2013.01); *G01S 7/2922* (2013.01); *G01S 13/0209* (2013.01)

(58) Field of Classification Search

None

See application file for complete search history.

(56) References Cited

U.S. PATENT DOCUMENTS

| | | | | |
|---|---|---|---|---|
| 5,513,221 | A * | 4/1996 | Parr ........................ | H04B 7/005 375/232 |
| 2018/0227714 | A1* | 8/2018 | Lee ........................ | H04L 67/12 |
| 2019/0271774 | A1* | 9/2019 | Zhang ...................... | G01S 13/87 |
| 2019/0271775 | A1* | 9/2019 | Zhang .................. | G01S 13/003 |
| 2020/0319301 | A1 | 10/2020 | Qiu et al. | |
| 2021/0359774 | A1* | 11/2021 | Tertinek .............. | G01S 13/0209 |

FOREIGN PATENT DOCUMENTS

| | | | |
|---|---|---|---|
| EP | 4080237 | A1 | 10/2022 |
| WO | 2022184215 | A1 | 9/2022 |

OTHER PUBLICATIONS

French Search Report issued in corresponding Patent Application No. FR 2306260 dated Nov. 29, 2023, 7 pages.

* cited by examiner

*Primary Examiner* — Bernarr E Gregory
(74) *Attorney, Agent, or Firm* — Buchanan Ingersoll & Rooney PC

(57) ABSTRACT

A method for estimating the distance of an element with respect to a vehicle on the basis of a detection module. The method includes, implemented by the detection module, determining the standard deviation of the phase of signals reflected from the element for each distance index of a series of distance indices, determining, in the order of the series, the first index for which the standard deviation is below a predetermined threshold for at least a predetermined length of time, and estimating the distance of the element with respect to the detection module on the basis of the determined index, the estimated distance corresponding to the predetermined distance associated with the determined index.

13 Claims, 3 Drawing Sheets

METHOD FOR ESTIMATING THE DISTANCE OF AN ELEMENT WITH RESPECT TO A VEHICLE

CROSS REFERENCE TO RELATED APPLICATIONS

This application claims priority to French Patent Application No. 2306260, filed Jun. 19, 2023, the contents of such applications being incorporated by reference herein.

FIELD OF THE INVENTION

The present invention relates to the automotive field and more particularly concerns a method for estimating the distance of an element with respect to a vehicle and a detection module implementing said method.

BACKGROUND OF THE INVENTION

In a motor vehicle, it is known to provide functions based on the distance of the user of said vehicle, for example to unlock the doors (this term here meaning any openable leaf such as the doors to the passenger compartment, the lid/door of the trunk/frunk, and potentially also the hood), using a key, a keycard or a smartphone.

Historically, the technology used was based either on radio-frequency (RF) and low-frequency (LF) communications between the vehicle and a key or a keycard, or on a capacitive sensor located in the handles of the doors.

However, at the present time these technologies do not allow new location-related functions to be offered, in particular due to a lack of accuracy. In addition, capacitive-sensor technology may malfunction as a result of moisture, ice or electrical interference.

To partially overcome these drawbacks, Bluetooth® technology has been used to communicate between the vehicle and the user's smartphone.

However, Bluetooth® technology has drawbacks in terms of security and accuracy.

A simple, reliable and effective solution allowing these drawbacks to be at least partially remedied would therefore be advantageous.

SUMMARY OF THE INVENTION

To this end, a first subject of the invention is a method for estimating the distance of an element with respect to a vehicle on the basis of a detection module, said method comprising the steps, implemented by said detection module:

of transmitting at least one signal on an ultra-wideband channel in the direction of said element, of receiving at least one signal reflected from said element, of determining the phase of the at least one received reflected signal for various distance indices of a series of distance indices, each index corresponding to one predetermined distance with respect to the detection module or to a predetermined distance range with respect to the detection module, of determining the standard deviation of the phase for each distance index of the series of distance indices, of determining, in the order of the series, the first index for which the standard deviation is below a predetermined threshold for at least a predetermined length of time, of estimating the distance of the element with respect to the detection module on the basis of the determined index, the estimated distance corresponding to the predetermined distance associated with the determined index.

In the present application, by "ultra-wideband" is meant the ultra-wideband (UWB) technology known per se. The method according to an aspect of the invention uses the "reflective mode" or "radar mode" of said UWB technology.

Use of the phase of the reflected signal makes it possible to detect the signature of a user or a movement of the user. However, use of the phase alone is insufficient because the phase is measured using a phase-locked loop which may cause so-called "phase" noise as a result of variations in the frequency oscillator of said loop. During signal phase changes representing the user or their movements at a given distance associated with one of the indices, the standard deviation decreases below the predetermined threshold, thus confirming the actual presence of the user at the distance corresponding to said index. The use of phase and standard deviation does not require the detection module to have computer processing capacities that are significantly high, thus making the method fast, simple, reliable and effective while limiting costs.

Preferably, the method comprises a step of filtering the phase signal in order to obtain a rectangular signal, to improve the computation of standard deviation.

Preferably, the method comprises a step of filtering the standard-deviation signal in order to obtain a rectangular signal, to facilitate determination, in the order of the series, of the first index for which the standard deviation is below a predetermined threshold for at least a predetermined length of time.

Advantageously, the method comprises a step of determining the channel impulse response, the phase being determined on the basis of said channel impulse response. Using channel impulse response (CIR) allows the amplitude and phase of the at least one received reflected signal to be easily determined.

An aspect of the invention also relates to a computer program product which is characterized in that it contains a set of program code instructions that, when executed by one or more processors, configure the one or more processors to implement a method as set out above.

An aspect of the invention also relates to a detection module for estimating the distance of an element with respect to a motor vehicle, said detection module being configured to be mounted in said vehicle and to transmit and receive ultra-wideband signals, said detection module being configured to:

transmit at least one signal on an ultra-wideband channel in the direction of said element, receive at least one signal reflected from said element, -determine the phase of the at least one received reflected signal for various distance indices of a series of distance indices, each index corresponding to one predetermined distance with respect to the detection module, determine the standard deviation of the phase for each distance index of the series of distance indices, determine, in the order of the series, the first index for which the standard deviation is below a predetermined threshold for at least a predetermined length of time, estimate the distance of the element with respect to the detection module on the basis of the determined index, the estimated distance corresponding to the predetermined distance associated with the determined index.

Preferably, the detection module is configured to filter the phase signal in order to obtain a rectangular signal and/or to filter the standard-deviation signal in order to obtain a rectangular signal.

Preferably, the detection module is configured to determine the channel impulse response and to determine the phase on the basis of said channel impulse response.

An aspect of the invention also relates to a motor vehicle comprising at least one detection module such as presented above.

In one embodiment, the vehicle comprises a plurality of detection modules such as presented above and an electronic control unit, each detection module being configured to send the determined index or the estimated distance to the electronic control unit at a given time, the electronic control unit being configured to locate the element on the basis of the received indices or of the received distances.

BRIEF DESCRIPTION OF THE DRAWINGS

Further features and advantages of aspects of the invention will become more clearly apparent on reading the following description. This description is purely illustrative and should be read with reference to the appended drawings, in which.

DETAILED DESCRIPTION OF EXEMPLARY EMBODIMENTS

Figure 1:
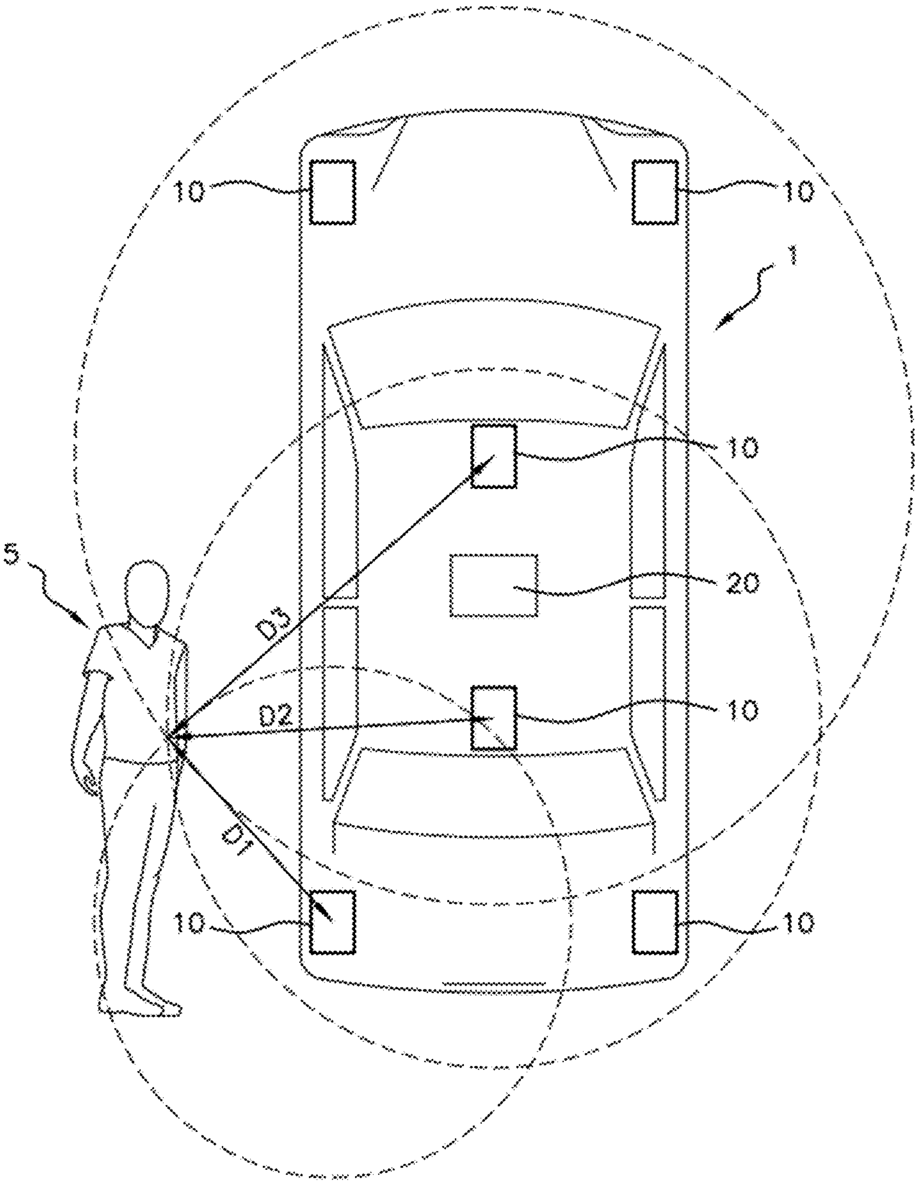
FIG. 1 schematically illustrates one embodiment of the system according to the invention.

FIG. 1 illustrates one example of a vehicle 1 according to an aspect of the invention.

Vehicle 1

In this example, the vehicle 1 comprises six detection modules 10 and one electronic control unit 20.

Detection Module 10

Each detection module 10 makes it possible to estimate the distance of an element with respect to the vehicle 1. This item may be a person or an object. In the example of FIG. 1, the element is a user 5 of the vehicle 1.

The detection modules 10 are mounted in various places on the vehicle 1, so that each detection module 10 may measure the distance between it and the user 5 depending on their location around the vehicle 1 or in the vehicle 1.

Each detection module 10 is configured to transmit and receive ultra-wideband signals. In particular, each detection module 10 is configured to transmit at least one signal on an ultra-wideband channel in the direction of the user 5, and to receive one or more signals reflected from the user 5, which are a product of the transmitted signals.

Each detection module 10 is configured to determine the phase of the at least one received reflected signal for various distance indices of a series of distance indices, where each index corresponds to one predetermined distance with respect to said detection module 10 or to a predetermined distance range.

The number of distance indices for each of which the phase and the standard deviation are determined is preferably chosen so as to limit the number of computations performed by each detection module 10. For example, the computations may be performed for less than 64 indices, for example 16 or 32 indices. Each index may for example correspond to one 'tap' of the UWB standard, corresponding to a distance increment of 15 cm (index 1=15 cm, index 2=30 cm, index 3=45 cm, . . . , index 10=150 cm, etc.).

Preferably, each detection module 10 is configured to determine the channel impulse response and to determine the phase on the basis of said channel impulse response.

Each detection module 10 is configured to determine the standard deviation of the phase for each distance index of the series of distance indices.

Preferably, each detection module 10 is configured to filter the phase signal in order to obtain a rectangular signal and/or to filter the standard-deviation signal in order to obtain a rectangular signal.

Each detection module 10 is configured to determine, in the order of the series, the first index for which the standard deviation is below a predetermined threshold for at least a predetermined length of time. This threshold may for example be preset to a fraction of the standard-deviation range measured in the absence of the user 5, for example between 0 and 50%. The predetermined length of time is for example advantageously greater than 50 or 100 ms for locating the position of a moving user 5, or 1 second in the context of movement detection (for example movement of a leg, to open the trunk).

Each detection module 10 is configured to estimate the distance of the user 5 with respect to the detection module 10, on the basis of the determined index. The estimated distance then corresponds to the predetermined distance or to the predetermined distance range (for example its median or mean) associated with the determined index.

Preferably, each detection module 10 is configured to send the index determined at a given time or the distance estimated at a given time to the electronic control unit 20.

Each detection module 10 comprises a processor or a microcontroller able to implement a set of instructions allowing these functions to be performed.

Electronic Control Unit 20

The electronic control unit 20 is configured to locate the user 5 on the basis of the received indices or received distances sent by a plurality of detection modules 10.

Example of Implementation

In this example, with reference to FIG. 1, the user 5 is located in proximity to the vehicle 1 and within range of the signals of three of the detection modules 10. Still in this non-limiting example, with reference to FIG. 3, the number of distance indices I1, . . . , I16, for each of which the phase and the standard deviation are determined, is chosen to be equal to 16.

Figure 2:
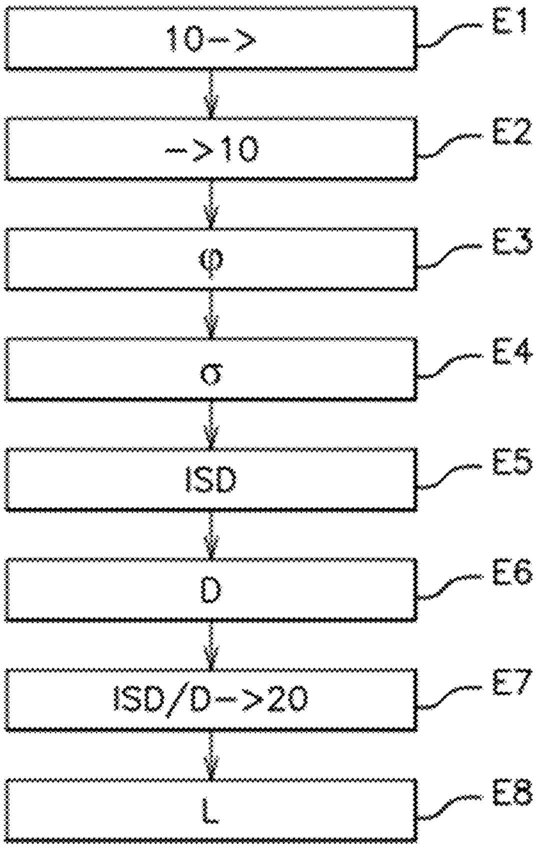
FIG. 2 schematically illustrates one embodiment of the method according to the invention.

Now with reference to FIG. 2, each detection module 10 transmits, in a step E1, a signal on an ultra-wideband channel around itself, in particular in the direction of the user 5. Preferably, the channels are the same for all the detection modules 10 and the signals are sent sequentially (each in turn). When transmitting in UWB reflective mode, the frequency is the same but the format of the frame (the preamble for example) is different. In UWB reflective mode, the detection module 10 immediately switches to reception mode with its own transmitted signal as filter (mask).

Some of the signals transmitted by the reception modules reflect from the user 5 then return directly or indirectly to the detection modules 10 that transmitted them.

In this example, three reception modules 10 receive, in a step E2, the signals reflected from the user 5.

Each reception module 10 having received at least one signal reflected from the user 5 then determines, in a step E3, the phase φ of the at least one received reflected signal for the various distance indices I1, . . . ,I16 of the series of distance indices I1, . . . ,I16, i.e. for 16 index values I1, . . . ,I16 in this example.

Each reception module 10 having determined the phase φ then determines, in a step E4, the standard deviation σ of the phase for each index I1, . . . ,I16 of the series. An optional filtering step may be carried out on the phase signal and/or on the standard-deviation signal in order to improve determination of the index in the following step E5.

Each reception module 10 having determined the standard deviation σ then determines, in a step E5, in the order of the series, the first index ISD for which said standard deviation σ is less than the predetermined threshold for at least the predetermined length of time Δt.

Figure 3:
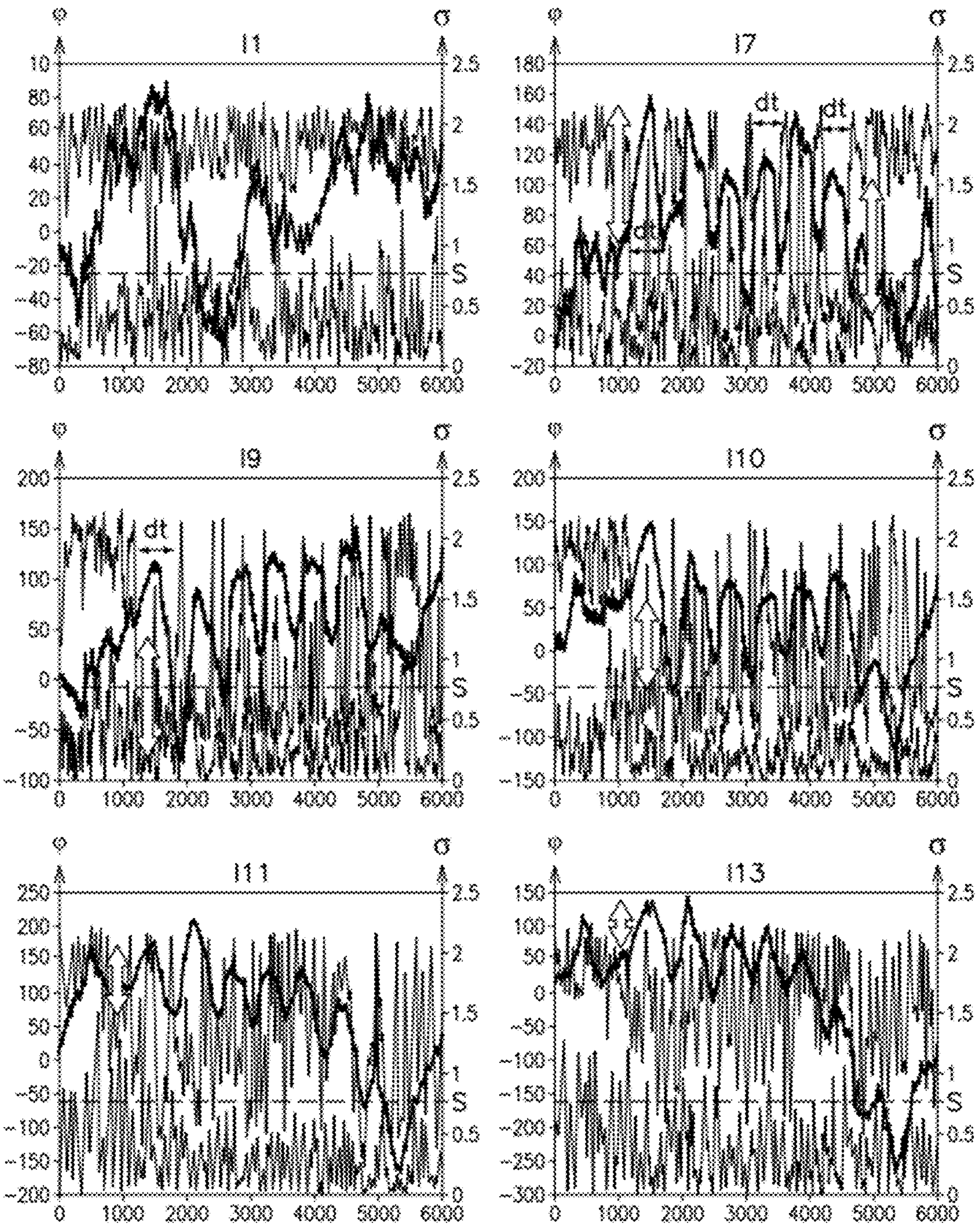
FIG. 3 contains six graphs showing phase φ and standard deviation σ for the indices 1, 7, 9, 10, 11 and 13, for a predetermined threshold S in respect of standard deviation σ of 0.8 and for a predetermined length of time Δt, for example 200 ms, and, for each graph, the envelope of the reflected signals.

FIG. 3 illustrates six graphs of phase φ and standard deviation σ for the indices 1, 7, 9, 10, 11 and 13, for a predetermined threshold S in respect of standard deviation σ of 0.8 and for a predetermined length of time Δt, for example 200 ms. Each graph also contains the envelope of the reflected signals. For reasons of clarity in the figures, it was not possible to show each reflected signal.

In this example, for the first index I1, the phase φ seems to detect the user 5 or a movement of the user 5 (series of peaks); however, the standard deviation σ does not fall below the predetermined threshold S of 0.8. The same goes for the indices I2 to I6 (not shown).

However, for the index I7, the phase φ seems to detect the user 5 or a movement of the user 5 (series of peaks) and the standard deviation σ falls below the predetermined threshold S of 0.8 for a length of time dt greater than the predetermined length of time Δt of 200 ms.

The index I7 is therefore the first index ISD of the series that meets the conditions of detection of the user 5. It will be noted that for the indices I9 and I10, detection is confirmed, thus making it possible to determine the thickness of the user 5. In contrast, the detection conditions (standard deviation σ falls below the predetermined threshold S of 0.8 for a length of time dt greater than the predetermined length of time Δt of 200 ms) are no longer met for the following indices starting from index I11.

Each reception module 10 then estimates, in a step E6, the distance D of the user 5 with respect to said detection module 10 on the basis of the index ISD determined by said detection module 10, the estimated distance D corresponding to the predetermined distance associated with the determined index ISD. In the example of FIG. 3, since the difference between each index is 15 cm, the index I1 corresponds to a distance of 105 cm, which thus corresponds to the estimated distance D.

Next, in the example of implementation, each reception module 10 then sends, in a step E7, either the determined index ISD or the estimated distance D to the electronic control unit 20. In the example of FIG. 1, the three detection modules 10 having received signals reflected from the user 5 imply the estimation of three distances D1, D2, D3 with respect to each of thereof.

More generally, when the electronic control unit 20 receives indices I1, . . . ,I16, it is able itself to estimate the distance D between each detection module 10 and the user 5, for example using a lookup table.

When the electronic control unit 20 knows the (determined or received) distance between each detection module 10 (having sent an index or a distance) and the user 5, the electronic control unit 20 determines, in a step E8, the location L of the user 5 by crossing the estimated distances D.

In other words, each distance D estimated by each detection module 10 defines a circle around said detection module 10, the user 5 being located at the intersection of said circles (when there are at least three detection modules 10, as in the example of FIG. 1) or at one of the two intersections of said circles (when there are two detection modules 10).

The use of the standard deviation σ to determine the index I1, . . . ,I16 is inexpensive in computer processing resources. Thus, an aspect of the invention therefore makes it possible to accurately, quickly, efficiently and reliably locate an element around or in the vehicle 1.

The invention claimed is:

1. A method for estimating a distance of an object with respect to a vehicle on the basis of a hardware based detection module, said method comprising the steps, implemented by said detection module:

of transmitting at least one signal on an ultra-wideband channel in the direction of said object, of receiving at least one signal reflected from said object, of determining a phase (φ) of the at least one received reflected signal for various distance indices of a series of distance indices, each index corresponding to one predetermined distance with respect to the detection module, of determining a standard deviation (σ) of the phase (φ) for each distance index of the series of distance indices, of determining, in the order of the series, the first index for which the standard deviation (σ) is below a predetermined threshold for at least a predetermined length of time (Δt), and of estimating the distance of the object with respect to the detection module on the basis of the determined index, the estimated distance corresponding to the predetermined distance associated with the determined index, and activating or enabling a function of the vehicle based on a result of the estimating of the distance.

2. The method as claimed in claim 1, comprising a step of filtering the phase (φ) in order to obtain a rectangular signal.

3. The method as claimed in claim 2, comprising a step of filtering the standard-deviation (σ) to obtain a rectangular signal.

4. The method as claimed in claim 1, comprising a step of filtering the standard-deviation (σ) to obtain a rectangular signal.

5. The method as claimed in claim 1, further comprising a step of determining the channel impulse response, the phase (φ) being determined on the basis of said channel impulse response.

6. A non-transitory computer program product, comprising a set of program code instructions that, when executed by one or more processors, configure the one or more processors to implement a method as claimed in claim 1.

7. The method as claimed in claim 1, wherein the object is a user of the vehicle.

8. A hardware based detection module for estimating a distance of an object with respect to a motor vehicle, said detection module being configured to be mounted in said vehicle and to transmit and receive ultra-wideband signals, said detection module being configured to:

transmit at least one signal on an ultra-wideband channel in the direction of said object, receive at least one signal reflected from said object, determine a phase (φ) of the at least one received reflected signal for various distance indices of a series of distance indices, each index corresponding to one predetermined distance with respect to the detection module, determine a standard deviation (σ) of the phase (φ) for each distance index of the series of distance indices, determine, in the order of the series, the first index for which the standard deviation (σ) is below a predetermined threshold for at least a predetermined length of time (Δt), and estimate the distance of the object with respect to the detection module on the basis of the determined index, the estimated distance corresponding to the predetermined distance associated with the determined index, and activating or enabling a function of the vehicle based on a result of the estimating of the distance.

9. The hardware based detection module as claimed in claim 8, said detection module being configured to filter the phase signal (φ) in order to obtain a rectangular signal and/or to filter the standard-deviation signal (σ) in order to obtain a rectangular signal.

10. The hardware based detection module as claimed in claim 9, said detection module being configured to determine the channel impulse response and to determine the phase on the basis of said channel impulse response.

11. The hardware based detection module as claimed in claim 8, said detection module being configured to determine the channel impulse response and to determine the phase (φ) on the basis of said channel impulse response.

12. A motor vehicle comprising at least one hardware based detection module as claimed in claim 11.

13. A vehicle comprising a plurality of hardware based detection modules as claimed in claim 8 and an electronic control unit, each detection module being configured to send the determined index or the estimated distance to the electronic control unit at a given time, the electronic control unit being configured to locate the object on the basis of the received indices or of the received distances.

* * * * *